(12) United States Patent
Izabel

(10) Patent No.: US 9,908,510 B2
(45) Date of Patent: Mar. 6, 2018

(54) HYDRAULIC AND/OR ELECTRICAL CONNECTION INTERFACE FOR WINDSCREEN WIPER

(71) Applicant: Valeo Systèmes d'Essuyage, Le Mesnil Saint Denis (FR)

(72) Inventor: Vincent Izabel, Chilly Mazarin (FR)

(73) Assignee: Valeo Systems d'Essuyage, Le Mesnil Saint Denis (FR)

( * ) Notice: Subject to any disclaimer, the term of this patent is extended or adjusted under 35 U.S.C. 154(b) by 345 days.

(21) Appl. No.: 14/276,769

(22) Filed: May 13, 2014

(65) Prior Publication Data

US 2014/0331438 A1    Nov. 13, 2014

(30) Foreign Application Priority Data

May 13, 2013  (FR) ...................................... 13 54280

(51) Int. Cl.
  *B60S 1/40*    (2006.01)
  *B60S 1/38*    (2006.01)
  *B60S 1/52*    (2006.01)

(52) U.S. Cl.
  CPC ........... *B60S 1/4006* (2013.01); *B60S 1/3862* (2013.01); *B60S 1/4048* (2013.01); *B60S 1/524* (2013.01); *B60S 2001/4051* (2013.01)

(58) Field of Classification Search
  CPC ............... B60S 1/3862; B60S 1/524; B60S 2001/4051; B60S 2001/4054; B60S 1/4038–1/4048; B60S 1/4064; B60S 2001/4058; B60S 2001/4061

USPC ........................................................ 15/250.04
See application file for complete search history.

(56) References Cited

U.S. PATENT DOCUMENTS

2011/0185531 A1\*  8/2011  Egner-Walter .......... B60S 1/381
                                                                   15/250.01

FOREIGN PATENT DOCUMENTS

EP           2460700 A1 \*  6/2012  ............ B60S 1/3862

\* cited by examiner

*Primary Examiner* — Andrew A Horton
(74) *Attorney, Agent, or Firm* — Osha Liang LLP

(57) ABSTRACT

The invention concerns an assembly for producing a vehicle windscreen wiping system (10), including an end fitting (14) of a wiper arm (12) adapted to move a wiper (16), a connection interface (50), and an intermediate part (40) called clamp, said assembly being adapted to occupy a working position in which said interface (50) is free relative to said end fitting (14) and a so-called service position in which said interface (50) is retained in an oriented manner inside said end fitting (14) by said clamp (40).

Figure 1:
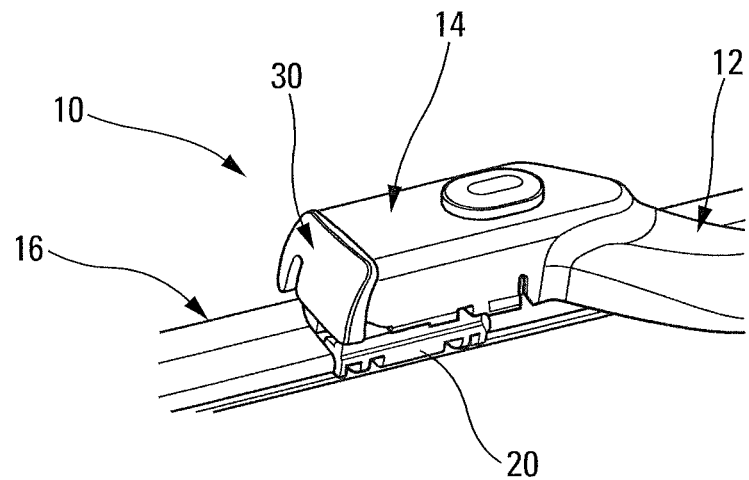

The invention also relates to a connection device for a vehicle windscreen wiping system (10) comprising such an assembly as well as a vehicle windscreen wiping system (10) comprising a wiper (16), a wiper arm (12) and such a connection device.

13 Claims, 3 Drawing Sheets

HYDRAULIC AND/OR ELECTRICAL CONNECTION INTERFACE FOR WINDSCREEN WIPER

The field of the present invention is that of equipment for vehicles and more particularly that of equipment for wiping the windows of motor vehicles.

Motor vehicles are routinely equipped with windscreen wiping systems for washing the windscreen and preventing disturbance to the driver's view of their environment. In the working position, these windscreen wipers are conventionally driven by wiper arms effecting an angular to-and-fro movement and include elongate wipers carrying wiper blades made from an elastic material. These blades rub against the windscreen and evacuate water out of the field of view of the driver. The wipers are produced in either the conventional form of articulated supporting bars that hold the wiper blade at a plurality of discrete locations or a more recent, so-called "flat blade" form of a semi-rigid assembly that holds the wiper blade over the whole of its length. In both solutions, the wiper is attached to the rotating windscreen wiper arm by an assembly consisting of a mechanical connector and an adapter. The mechanical connector is a part that is crimped to the supporting bar or directly to the flat wiper and the adapter is an intermediate part for fixing the connector to the rotating wiper arm. These two parts are connected to each other by a transverse shaft that allows relative rotation thereof in a plane perpendicular to the windscreen and passing through the wiper arm.

It is also known to provide vehicles with devices for feeding a windscreen washing liquid from a tank located under the bonnet and spraying it in the direction of the windscreen via nozzles located either near the windscreen or on the windscreen wiper itself for better distribution of the liquid. In the case of nozzles on the wipers, the windscreen washing liquid is fed via pipes that are fixed to the wiper arm and are connected to the wiper via a connection interface at the level of the mechanical connector. The connection interface is fixed to the mechanical connector by appropriate terminations and makes the necessary seal to it.

The liquid pipes and the connection interface are generally connected to the wiper arm. However, it is necessary to connect the connection interface to the mechanical connector when changing the wiper. After said connection, the connection interface is connected to the wiper. This operation is effected in a so-called service position.

It is necessary to ensure that the connection interface is correctly aligned during installation in the mechanical connector, failing which incorrect assembly would be reflected in a risk of the windscreen washing liquid leaking at the level of the junction of the two connectors.

Furthermore, it is important that the connection interface remains attached to the wiper arm during decoupling or demounting of the wiper relative to the wiper arm. This prevents the connection interface being entrained by the mechanical connector during the movement separating it from the wiper arm.

However, after mounting the wiper in the arm, the connection interface must not limit the necessary freedom of movement in rotation of the adapter relative to the mechanical connector.

To this end there are known windscreen wipers in which the connection interface is held in the service position by clipping it into openings in an intermediary part internal to the wiper arm, such as that described in application WO2012072748.

A certain number of users however have difficulties in switching the wiper to the service position since the latter is implemented inside the wiper arm, without being visible to the user.

An object of the present invention is to remedy some or all of these drawbacks.

To this end, the invention consists in an assembly for producing a vehicle windscreen wiping system including an end fitting of a wiper arm adapted to move a wiper, a connection interface and an intermediate part called clamp, said assembly being adapted to occupy a working position in which said interface is free relative to said end fitting and a so-called service position in which said interface is retained in an oriented manner inside said end fitting by said clamp.

According to the invention, at least a part of said clamp is configured in such a way as to be accessible so as to be able to be manipulated to switch from the working position to the service position, said assembly comprising at least one first snug situated on one of the elements out of said clamp and said interface, and at least one recess, situated on the other element, said first snug or snugs being suitable for being housed in said recess or recesses in the service position, said clamp comprising shapes suitable for guiding said first snug or snugs towards said recess or recesses.

The mounting operations are thus more intuitive because they involve a part, namely the clamp, that is externally visible. Furthermore, by virtue of the guiding of the interface relative to the clamp, the risk of making a mistake is reduced and the mounting of a replacement wiper is simplified, in particular with regard to the connection of the interface to the wiper.

According to different embodiments of the invention, which will be able to be taken together or separately:

said recess or recesses is/are situated on said clamp and define a first abutment, said first snug or snugs is/are cylindrical, the shapes suitable for guiding said first snug or snugs towards said recess or recesses are guiding slopes, said guiding slopes form one or more funnels, said clamp comprises at least one second abutment suitable for preventing said interface from pivoting relative to said clamp, said second abutment or abutments is/are configured to bear on said interface, in the service position, at a distance from said first snug or snugs, said clamp is translationally mobile in a longitudinal direction of said end fitting, said interface has means suitable for immobilizing it on a so-called mechanical connector fixed to said wiper, in the working position, said means are second snugs, different from the first snug or snugs, said second snugs are cylindrical and suitable for being retained by key-forms, said key-forms being at least partly cylindrical and belonging to said mechanical connector, said connection interface comprises at least one hydraulic connector and/or one electrical connector, said interface comprises means ensuring the locking of the electrical connector to said hydraulic connector, said clamp comprises a button making it possible to switch it from said working position to said service position, said button being mobile along a slot situated on said end fitting and oriented in a direction of mounting and/or removal of the wiper in said end fitting, said slot is situated on a face of said end fitting intended to be situated opposite the wiper.

The intuitive aspect of the operations to be performed in order to mount/remove the wiper is thus reinforced.

The invention also relates to a connection device for a vehicle windscreen wiping system including an assembly as described above.

The invention further concerns a vehicle windscreen wiping system including a wiper, a wiper arm and a connection device as described above for attaching said wiper to said wiper arm.

The invention will be better understood and other objects, details, features and advantages thereof will become more clearly apparent in the course of the following detailed explanatory description of at least one embodiment of the invention provided by way of purely illustrative and non-limiting example given with reference to the appended diagrammatic drawings.

IN THESE DRAWINGS

Figure 2:
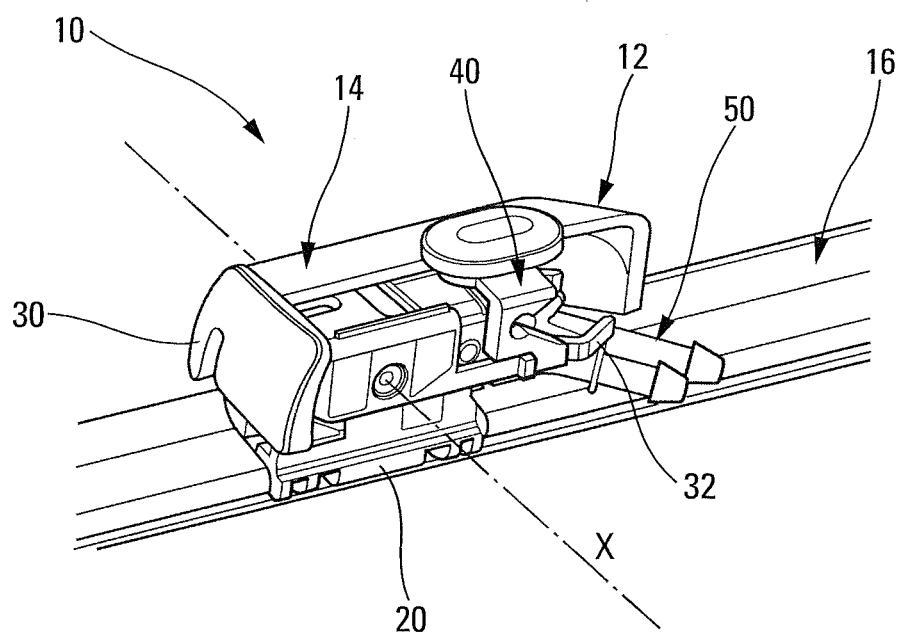
Figure 3:
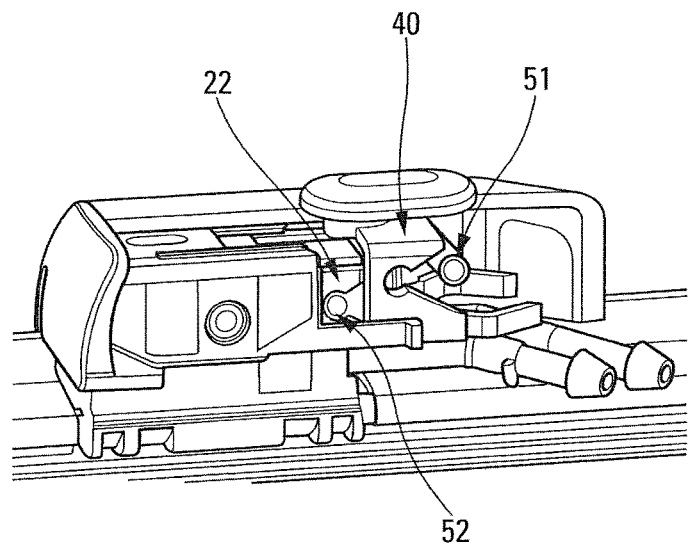
Figure 4:
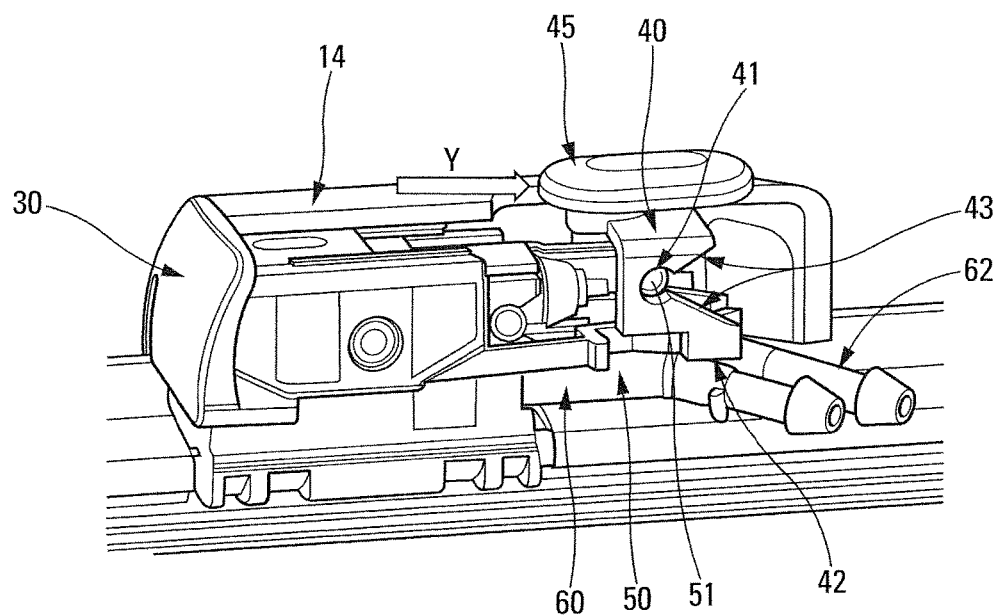
Figure 5:
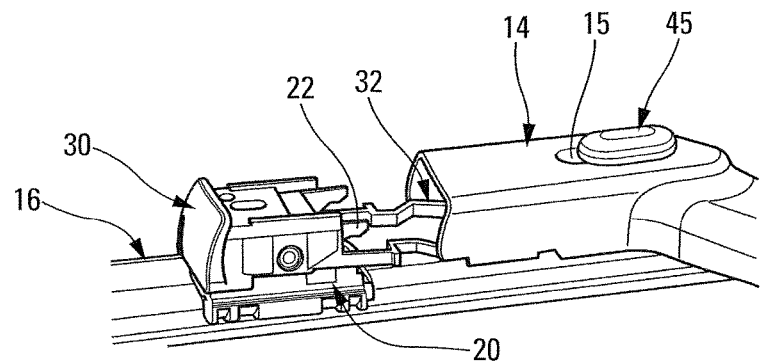
Figure 6:
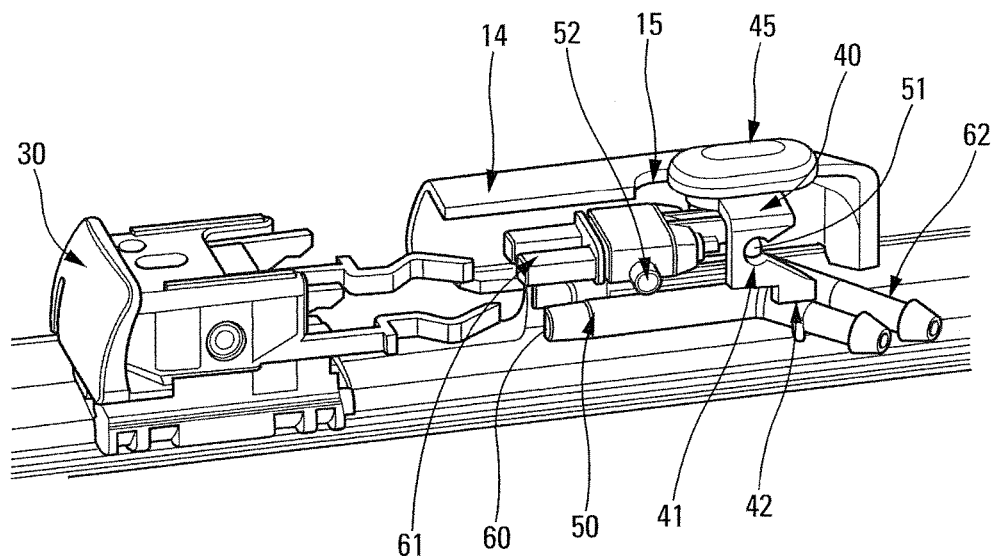

FIG. 1 is a perspective view of an assembly according to the invention, in the working position, FIG. 2 is the same view as FIG. 1, the end fitting of the wiper arm being cut away to show the connection interface, the clamp and the adapter of a connection device according to the invention, FIG. 3 is a repeat of FIG. 2 from a different viewing angle;

FIG. 4 is a repeat of FIG. 3 showing the way in which the clamp of the invention is manipulated to drive the connection interface from the working position to the service position, FIG. 5 is a perspective view of the assembly according to the invention, in the service position, FIG. 6 is the same view as FIG. 5, the end fitting of the wiper arm being cut away to show the connection interface retained by the clamp inside said end fitting.

As illustrated in the different figures, the invention relates to a vehicle windscreen wiping system 10. This system comprises a wiper arm 12 which has an end fitting or arm head 14, hereinafter called end fitting. The wiper arm 12 is intended to move a wiper 16 of said wiping system on the surface of a vehicle windscreen.

The wiper 16 is attached to the wiper arm 12 by a mechanical connector 20 and an adapter 30 of a connection device of said wiping system. The mechanical connector 20 is a part which, for example, is crimped onto the wiper 16. The adapter 30 is an intermediate part which makes it possible to fix the connector 20 to the end fitting 14 of the wiper arm 12. These two parts are linked to one another by a transverse axis which allows their relative rotation, in a plane at right angles to the windscreen and passing through the wiper arm 12.

This transverse axis X can be seen in FIG. 2. This FIG. 2 also shows a connection interface 50 of said connection device. This connection interface 50 makes it possible to supply the wipers 16 with windscreen washer liquid and/or with electricity when it is designed to be able to heat the structure of said wiper 16, for example.

As a reminder, FIGS. 1 and 2 are perspective views of an assembly according to the invention, in the working position, said assembly comprising said end fitting 14 and said connection interface 50.

In the working position, the interface 50 is free relative to said end fitting 14 but it is secured relative to the wiper 16. This securing is here produced both by a distal part of tabs 32 belonging to the adapter and by the connector 20 which has characteristic shapes making it possible to retain said connection interface 50.

An exemplary embodiment of these characteristic shapes can be seen in FIG. 3. These are key-forms 22, partly cylindrical, which cooperate with snugs 52 belonging to the connection interface 50. The key-forms 22 are not closed; they each have an opening which is used by each of the snugs 52 to be housed therein. There are preferably two of these snugs 52, situated on side faces of the interface 50, opposite one another relative to a direction of longitudinal extension of said interface 50, the length of said interface 50 being oriented in the longitudinal direction of the end fitting 14.

These snugs 52 will hereinafter be called second snugs, by contrast with the first snugs 51 which also belong to the connection interface 50 but which have another function.

Said first snugs 51 can be seen in FIG. 3; their function is advantageously illustrated in FIG. 4. There are preferably two of these first snugs 51, here situated on the side faces of the interface 50, opposite one another relative to the width of said interface 50. It should be noted that said second snugs 52 are closer to the mechanical connector 20 than said first snugs 51 can be.

The first snugs 51 are particularly advantageous because they participate in the switchover of the assembly according to the invention from the working position to the so-called service position.

The service position, illustrated in FIG. 4, is the position for which the wiper 16 is dismantled from the wiper arm 12. In the service position, the interface 50 is retained in an oriented manner inside the end fitting 14. This retention is permitted by an intermediate part, called clamp 40.

In practice, said first snugs 51 are suitable for coming into contact with the clamp 40, in particular in recesses 41 thereof. The entry of the snugs 51 into the recesses 41 is facilitated by guiding shapes 43, namely guiding slopes, which, when they are coupled, form funnels. The first snugs 51 are preferably cylindrical to simplify the guiding of the first snugs 51 towards the recesses 41.

Said recesses 41 act like first abutments between the interface 50 and the clamp 40. This is why any other shape can be envisaged for said first snugs which can also be parallelepipedal or pyramidal, for example.

The clamp 40 is also provided with second abutments 42 which prevent the interface 50 from pivoting relative to it, in particular in the case of cylindrical first snugs 51. These second abutments 42 in this way prevent the pivoting of said interface in the end fitting when the wiper 16 is uncoupled from the end fitting 14. Said second abutments 42 are here configured to bear on the interface 50, in particular on the liquid pipes 62 of a hydraulic connector 60 belonging to the connection interface 50.

It should be noted that, in the working position, the clamp 40 advantageously does not enter into contact with the interface 50 as can be seen in FIGS. 2 and 3.

FIG. 5 is a perspective view of the assembly according to the invention in the service position. It can be seen therein that the interface 50 is no longer coupled to the wiper 16, the adapter 30 having been dismantled from the end fitting 14. This means that the second snugs 52 are no longer engaged in the key-forms 22 of the connector 20. This also means that the distal part of the tabs 32 of the adapter 30 no longer abuts with the connection interface 50.

FIG. 6 is the same view as FIG. 5, the end fitting of the wiper arm being cut away to show the connection interface. It can be seen therein that the interface 50 is then retained by the clamp 40 inside the end fitting 14. This figure illustrates the double-locking of the interface 50 inside the end fitting 14; this double-locking being produced by the clamp 40, with the aid of the abutments 41 and 42 described above, and making it possible to orient the interface to simplify the mounting of a new wiper.

It should be noted that this invention preferably relates to the hydraulic and/or electrical connection of a wiper 16 having an embedded washing function and/or a system for heating its structure. In particular, this invention relates to the hydraulic and/or electrical connection and disconnection of the wiper 16, with the wiper arm 12, in a single movement when dismantling the wiper 16 from its wiper arm 12.

The description of FIGS. 1 to 3 showed how the connection interface 50 is retained on the wiper 16 via the connector 20 in the working position, namely when the wiper 16 and the wiper arm 12 are assembled, while allowing the rotation of the wiper relative to the arm about the axis X.

The description of FIGS. 4 to 6 made it possible to introduce the clamp 40 which abuts, among other things, against the first snugs 51 of the connection interface in the switchover from the working position to the service position; the service position corresponding to the dismantling of the wiper 16 and the wiper arm 12, the connection interface 50 then being kept oriented relative to the arm.

The dismantling action is performed when the clamp 40 is slid relative to the end fitting 14 of the wiper arm 12. This is made possible because a part of the clamp 40 is accessible so as to be able to be manipulated to switch from the working position to the service position.

As can be seen in FIGS. 4 to 6, the clamp in fact comprises an abutment 45 making it possible to switch it from the working position to the service position. The button 45 is mobile along a slot 15 situated on said end fitting and oriented in a direction of mounting and/or removal. This slot 15 is preferably situated on a face of said end fitting 14 intended to be situated opposite the wiper 16. It will be able to be situated on one or more other faces of the end fitting 14.

Also, the end fitting 14 is designed to partly cover the interface 50 and said clamp 40, apart from said button 45.

The direction of mounting and/or removal is indicated by an arrow Y in FIG. 4. In the case of this arrow Y, the button 45 is actuated in the slot 15 in the direction of removal of the adapter 30—the slot 15 being particularly visible in FIGS. 5 and 6. The actuation of the button 45 causes the clamp 40 to abut with the interface 50, at two points: by the first abutments 41 and the second abutments 42. It is then possible to pull longitudinally on the wiper 16 to dismantle it from the wiper arm 12 while retaining the interface 50 in the end part 14 of the wiper arm 12. To recap, this prevents said interface 50 from being driven by the mechanical connector 20 in its movement of separation from the wiper arm 12 of the windscreen wiper.

To refit, the same operations are performed in reverse.

It should be noted that, in the example described above, the connection interface 50 comprises a hydraulic connector 60 and an electrical connector 61, as can be seen in particular in FIG. 6; said interface 50 comprising means ensuring the locking of the hydraulic connector 61 onto the electrical connector 60 (locking means not detailed in the figures).

Here, the first and second snugs 51, 52 are on the electrical connector 60 rather than on the hydraulic connector. It is however possible for them to be provided on the hydraulic connector.

It should also be noted that other variant embodiments are of course possible. In particular, it is also possible to envisage, in an additional embodiment, having the first and second snugs of said assembly situated on the clamp 40 whereas, for their part, the abutments would be situated on the interface 50.

The invention claimed is:

1. An assembly for producing a vehicle windscreen wiping system, comprising:
   an end fitting of a wiper arm adapted to move a wiper;
   a connection interface and an intermediate clamp, said assembly being adapted to occupy a working position in which said interface is free relative to said end fitting and a service position in which said interface is retained in an oriented manner inside said end fitting by said clamp,
   wherein at least a part of said clamp is configured in such a way as to be accessible so as to be able to be manipulated to switch from the working position to the service position,
   wherein, in the working position, the vehicle windscreen wiping system is in a fully assembled state, configured for windshield wiping,
   wherein, in the service position, the vehicle windscreen wiping system is in an at least partially disassembled state, to enable separation of the wiper from the wiper arm, and
   wherein said assembly comprises at least one first snug situated on said interface, and at least one recess, situated on the clamp,
   said first snug or snugs being housed in said recess or recesses in the service position,
   said first snug or snugs being outside of said recess or recesses in the working position, and
   said clamp comprising shapes suitable for guiding said first snug or snugs towards said recess or recesses during the switching from the working position to the service position.

2. The assembly according to claim 1, wherein said recess or recesses define a first abutment.

3. The assembly according to claim 2, wherein said clamp comprises at least one second abutment suitable for preventing said interface from pivoting relative to said clamp.

4. The assembly according to claim 3, wherein said second abutment or abutments is/are configured to bear on said interface, in the service position, at a distance from said first snug or snugs.

5. The assembly according to claim 1, wherein said first snug or snugs is/are cylindrical.

6. The assembly according to claim 1, wherein said clamp is translationally mobile in a longitudinal direction of said end fitting.

7. The assembly according to claim 1, wherein said interface has means suitable for immobilizing the interface on a mechanical connector fixed to said wiper, in the working position.

8. The assembly according to claim 7, wherein said means are second snugs, different from the first snug or snugs.

9. The assembly according to claim 8, wherein said second snugs are cylindrical and suitable for being retained by key-forms, said key-forms being at least partly cylindrical and belonging to said mechanical connector.

10. The assembly according to claim 1, wherein said connection interface comprises at least one hydraulic connector and/or one electrical connector.

11. The assembly according to claim 1, wherein said clamp comprises a button configured to switch the clamp from said working position to said service position, said button being mobile along a slot situated on said end fitting and oriented in a direction of mounting and/or removal of the wiper in said end fitting.

12. The assembly according to claim 11, wherein said slot is situated on a face of said end fitting configured to be opposite to the wiper.

13. A connection device for a vehicle windscreen wiping system comprising the assembly according to claim 1.

* * * * *